United States Patent
Candelore et al.

(10) Patent No.: US 7,567,939 B2
(45) Date of Patent: *Jul. 28, 2009

(54) METHOD AND APPARATUS FOR IMPLEMENTING REVOCATION IN BROADCAST NETWORKS

(75) Inventors: Brant L. Candelore, Escondido, CA (US); Mark Eyer, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/500,565

(22) Filed: Aug. 8, 2006

(65) Prior Publication Data

US 2006/0271492 A1  Nov. 30, 2006

Related U.S. Application Data

(63) Continuation of application No. 09/504,968, filed on Feb. 15, 2000, now Pat. No. 7,225,164.

(51) Int. Cl.
*G06F 17/60* (2006.01)
(52) U.S. Cl. .................... 705/57; 705/64; 705/67
(58) Field of Classification Search .......... 705/57, 705/64, 67
See application file for complete search history.

(56) References Cited

U.S. PATENT DOCUMENTS

| | | |
|---|---|---|
| 3,852,519 A | 12/1974 | Court |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |

(Continued)

FOREIGN PATENT DOCUMENTS

CA  2328645  7/2001

(Continued)

OTHER PUBLICATIONS

Aravind, H., et al., "Image and Video Coding Standards," AT&T Technical Journal, (Jan./Feb. 1993), 67-68.

(Continued)

*Primary Examiner*—Pierre E Elisca
(74) *Attorney, Agent, or Firm*—Blakely, Sokoloff, Taylor & Zafman LLP

(57) ABSTRACT

A method of revoking a descrambling privilege for copy controlled content to a host device is provided. The method includes receiving copy controlled content at a conditional access module. A revocation list is also received at the module. The method includes determining whether the host device associated with the module is on the list. If so, the conditional access module will not descramble the content.

29 Claims, 4 Drawing Sheets

U.S. PATENT DOCUMENTS

| | | | |
|---|---|---|---|
| 4,785,361 A | 11/1988 | Brotby |
| 4,788,589 A | 11/1988 | Kondo |
| 4,802,215 A | 1/1989 | Mason |
| 4,803,725 A | 2/1989 | Horne et al. |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson et al. |
| 5,122,873 A | 6/1992 | Golin |
| 5,124,117 A | 6/1992 | Tatebayashi et al. |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski et al. |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin et al. |
| 5,539,828 A | 7/1996 | Davis |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Dillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis |
| 5,726,702 A | 3/1998 | Hamaguchi et al. |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,757,417 A | 5/1998 | Aras et al. |
| 5,757,909 A | 5/1998 | Park |
| 5,768,539 A | 6/1998 | Metz et al. |
| 5,784,464 A | 7/1998 | Akiyama et al. |
| 5,787,171 A | 7/1998 | Kubota et al. |
| 5,787,179 A | 7/1998 | Ogawa et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,897,218 A | 4/1999 | Nishimura et al. |
| 5,915,018 A | 6/1999 | Aucsmith |
| 5,917,830 A | 6/1999 | Chen et al. |
| 5,917,915 A | 6/1999 | Hirose |
| 5,922,048 A | 7/1999 | Eumura |
| 5,923,486 A | 7/1999 | Suyiyama et al. |
| 5,923,755 A | 7/1999 | Birch |
| 5,930,361 A | 7/1999 | Hayashi et al. |
| 5,933,500 A | 8/1999 | Blatter et al. |
| 5,940,738 A | 8/1999 | Rao |
| 5,949,877 A * | 9/1999 | Traw et al. .................. 713/171 |
| 5,949,881 A | 9/1999 | Davis et al. |
| 5,963,909 A | 10/1999 | Warren et al. |
| 5,973,679 A | 10/1999 | Abbott et al. |
| 5,973,722 A | 10/1999 | Wakai et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Isibashi |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobbson |
| 6,055,314 A | 4/2000 | Spies et al. |
| 6,055,315 A | 4/2000 | Doyle et al. |
| 6,057,872 A | 5/2000 | Candelore |

| | | | | | | |
|---|---|---|---|---|---|---|
| 6,058,186 | A | 5/2000 | Enari | 6,477,649 | B2 | 11/2002 | Kambayashi et al. |
| 6,058,192 | A | 5/2000 | Guralnick et al. | 6,505,032 | B1 | 1/2003 | McCorkle et al. |
| 6,061,451 | A | 5/2000 | Muratani et al. | 6,510,554 | B1 | 1/2003 | Gordon et al. |
| 6,064,748 | A | 5/2000 | Hogan | 6,519,693 | B1 | 2/2003 | Debey |
| 6,065,050 | A | 5/2000 | DeMoney | 6,526,144 | B2 | 2/2003 | Markandey et al. |
| 6,069,647 | A | 5/2000 | Sullivan et al. | 6,529,526 | B1 | 3/2003 | Schneidenwend |
| 6,072,872 | A | 6/2000 | Chang et al. | 6,543,053 | B1 | 4/2003 | Li et al. |
| 6,072,873 | A | 6/2000 | Bewick | 6,549,229 | B1 | 4/2003 | Kirby et al. |
| 6,073,122 | A | 6/2000 | Wool | 6,550,008 | B1 | 4/2003 | Zhang et al. |
| 6,088,450 | A | 7/2000 | Davis et al. | 6,557,031 | B1 | 4/2003 | Mimura et al. |
| 6,105,134 | A | 8/2000 | Pinder et al. | 6,587,561 | B1 | 7/2003 | Sered et al. |
| 6,108,422 | A | 8/2000 | Newby et al. | 6,590,979 | B1 | 7/2003 | Ryan |
| 6,115,821 | A | 9/2000 | Newby et al. | 6,609,039 | B1 | 8/2003 | Schoen |
| 6,118,873 | A | 9/2000 | Lotspiech et al. | 6,640,145 | B2 | 10/2003 | Hoffberg et al. |
| 6,125,349 | A | 9/2000 | Maher | 6,640,305 | B2 | 10/2003 | Kocher et al. |
| 6,134,237 | A | 10/2000 | Brailean et al. | 6,650,754 | B2 | 11/2003 | Akiyama et al. |
| 6,134,551 | A | 10/2000 | Aucsmith | 6,654,389 | B1 | 11/2003 | Brunheroto et al. |
| 6,138,237 | A | 10/2000 | Ruben et al. | 6,678,740 | B1 | 1/2004 | Rakib et al. |
| 6,154,206 | A | 11/2000 | Ludtke | 6,681,326 | B2 | 1/2004 | Son et al. |
| 6,157,719 | A | 12/2000 | Wasilewski et al. | 6,697,489 | B1 | 2/2004 | Candelore |
| 6,181,334 | B1 | 1/2001 | Freeman et al. | 6,697,944 | B1 | 2/2004 | Jones et al. |
| 6,185,369 | B1 | 2/2001 | Ko et al. | 6,707,696 | B1 | 3/2004 | Turner et al. |
| 6,185,546 | B1 | 2/2001 | Davis | 6,714,650 | B1 | 3/2004 | Maillard et al. |
| 6,189,096 | B1 | 2/2001 | Haverty | 6,754,276 | B1 | 6/2004 | Harumoto et al. |
| 6,192,131 | B1 * | 2/2001 | Geer et al. ............... 380/283 | 6,772,340 | B1 | 8/2004 | Peinado et al. |
| 6,199,053 | B1 | 3/2001 | Herbert et al. | 6,788,690 | B2 | 9/2004 | Harri |
| 6,204,843 | B1 | 3/2001 | Freeman et al. | 6,788,882 | B1 | 9/2004 | Geer et al. |
| 6,209,098 | B1 | 3/2001 | Davis | 6,826,185 | B1 | 11/2004 | Montanaro et al. |
| 6,215,484 | B1 | 4/2001 | Freeman et al. | 6,834,110 | B1 | 12/2004 | Marconcini et al. |
| 6,222,924 | B1 | 4/2001 | Salomaki | 6,895,128 | B2 | 5/2005 | Bohnenkamp |
| 6,223,290 | B1 | 4/2001 | Larsen et al. | 6,904,520 | B1 | 6/2005 | Rosset et al. |
| 6,226,618 | B1 | 5/2001 | Downs | 6,917,684 | B1 | 7/2005 | Tatebayashi et al. |
| 6,229,895 | B1 | 5/2001 | Son et al. | 6,938,162 | B1 | 8/2005 | Nagai et al. |
| 6,230,194 | B1 | 5/2001 | Frailong et al. | 6,976,166 | B2 | 12/2005 | Herley et al. |
| 6,230,266 | B1 | 5/2001 | Perlman et al. | 7,039,802 | B1 | 5/2006 | Eskicioglu et al. |
| 6,233,577 | B1 | 5/2001 | Ramasubramani et al. | 7,039,938 | B2 | 5/2006 | Candelore |
| 6,236,727 | B1 | 5/2001 | Ciacelli et al. | 7,058,806 | B2 | 6/2006 | Smeets et al. |
| 6,240,553 | B1 | 5/2001 | Son et al. | 7,065,213 | B2 | 6/2006 | Pinder |
| 6,246,720 | B1 | 6/2001 | Kutner et al. | 7,120,250 | B2 | 10/2006 | Candelore |
| 6,247,127 | B1 | 6/2001 | Vandergeest | 7,124,303 | B2 | 10/2006 | Candelore et al. |
| 6,256,747 | B1 | 7/2001 | Inohara et al. | 7,127,619 | B2 | 10/2006 | Unger et al. |
| 6,263,506 | B1 | 7/2001 | Ezaki et al. | 7,139,398 | B2 | 11/2006 | Candelore et al. |
| 6,266,416 | B1 | 7/2001 | Sigbjornsen et al. | 7,146,007 | B1 | 12/2006 | Maruo et al. |
| 6,266,480 | B1 | 7/2001 | Ezaki et al. | 7,151,831 | B2 | 12/2006 | Candelore et al. |
| 6,272,538 | B1 | 8/2001 | Holden et al. | 7,155,012 | B2 | 12/2006 | Candelore et al. |
| 6,278,783 | B1 | 8/2001 | Kocher et al. | 7,242,766 | B1 | 7/2007 | Lyle |
| 6,289,455 | B1 | 9/2001 | Kocher et al. | 2001/0030959 | A1 | 10/2001 | Ozawa et al. |
| 6,292,568 | B1 | 9/2001 | Akins et al. | 2001/0036271 | A1 | 11/2001 | Javed |
| 6,292,892 | B1 | 9/2001 | Davis | 2001/0042043 | A1 | 11/2001 | Shear et al. |
| 6,307,939 | B1 | 10/2001 | Vigarie | 2002/0003881 | A1 | 1/2002 | Reitmeier et al. |
| 6,311,012 | B1 | 10/2001 | Cho et al. | 2002/0021805 | A1 | 2/2002 | Schumann et al. |
| 6,324,288 | B1 | 11/2001 | Hoffman | 2002/0026587 | A1 | 2/2002 | Talstra et al. |
| 6,330,672 | B1 | 12/2001 | Shur | 2002/0046406 | A1 | 4/2002 | Chelehmal et al. |
| 6,351,538 | B1 | 2/2002 | Uz | 2002/0047915 | A1 | 4/2002 | Misu |
| 6,351,813 | B1 | 2/2002 | Mooney et al. | 2002/0059425 | A1 | 5/2002 | Belfiore et al. |
| 6,377,589 | B1 | 4/2002 | Knight et al. | 2002/0066101 | A1 | 5/2002 | Gordon et al. |
| 6,378,130 | B1 | 4/2002 | Adams | 2002/0083438 | A1 | 6/2002 | So et al. |
| 6,389,533 | B1 | 5/2002 | Davis et al. | 2002/0090090 | A1 | 7/2002 | Van Rijnsoever et al. |
| 6,389,537 | B1 | 5/2002 | Davis et al. | 2002/0094084 | A1 | 7/2002 | Wasilewski et al. |
| 6,415,031 | B1 | 7/2002 | Colligan et al. | 2002/0097322 | A1 | 7/2002 | Monroe et al. |
| 6,415,101 | B1 | 7/2002 | deCarmo et al. | 2002/0108035 | A1 | 8/2002 | Herley et al. |
| 6,418,169 | B1 | 7/2002 | Datari | 2002/0116705 | A1 | 8/2002 | Perlman et al. |
| 6,424,717 | B1 | 7/2002 | Pinder et al. | 2002/0126890 | A1 | 9/2002 | Katayama |
| 6,430,361 | B2 | 8/2002 | Lee | 2002/0129243 | A1 | 9/2002 | Nanjundiah |
| 6,442,689 | B1 | 8/2002 | Kocher | 2002/0150239 | A1 | 10/2002 | Carny et al. |
| 6,445,738 | B1 | 9/2002 | Zdepski et al. | 2002/0164022 | A1 | 11/2002 | Strasser et al. |
| 6,449,718 | B1 | 9/2002 | Rucklidge et al. | 2002/0170053 | A1 | 11/2002 | Peterka et al. |
| 6,452,923 | B1 | 9/2002 | Gerszberg et al. | 2002/0184506 | A1 | 12/2002 | Perlman |
| 6,453,115 | B1 | 9/2002 | Boyle | 2002/0194613 | A1 | 12/2002 | Unger |
| 6,456,985 | B1 | 9/2002 | Ohtsuka | 2002/0196939 | A1 | 12/2002 | Unger et al. |
| 6,459,427 | B1 | 10/2002 | Mao et al. | 2003/0009669 | A1 | 1/2003 | White et al. |
| 6,463,152 | B1 | 10/2002 | Takahashi | 2003/0021412 | A1 | 1/2003 | Candelore et al. |
| 6,466,671 | B1 | 10/2002 | Maillard et al. | 2003/0026423 | A1 | 2/2003 | Unger et al. |

| | | |
|---|---|---|
| 2003/0026523 A1 | 2/2003 | Chua et al. |
| 2003/0035540 A1 | 2/2003 | Freeman et al. |
| 2003/0035543 A1 | 2/2003 | Gillon et al. |
| 2003/0046686 A1 | 3/2003 | Candelore et al. |
| 2003/0059047 A1 | 3/2003 | Iwamura |
| 2003/0063615 A1 | 4/2003 | Iuoma et al. |
| 2003/0072555 A1 | 4/2003 | Yap et al. |
| 2003/0081630 A1 | 5/2003 | Mowery et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0108199 A1 | 6/2003 | Pinder et al. |
| 2003/0123664 A1 | 7/2003 | Pedlow, Jr. et al. |
| 2003/0123849 A1 | 7/2003 | Nallur et al. |
| 2003/0133570 A1 | 7/2003 | Candelore et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0156718 A1 | 8/2003 | Candelore et al. |
| 2003/0159139 A1 | 8/2003 | Candleor et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0174844 A1 | 9/2003 | Candelore |
| 2003/0188164 A1 | 10/2003 | Okimoto et al. |
| 2003/0190054 A1 | 10/2003 | Troyansky et al. |
| 2003/0198223 A1 | 10/2003 | Mack et al. |
| 2003/0204717 A1 | 10/2003 | Kuehnel |
| 2003/0222994 A1 | 12/2003 | Dawson |
| 2003/0226149 A1 | 12/2003 | Chun et al. |
| 2004/0003008 A1 | 1/2004 | Wasilewski et al. |
| 2004/0021764 A1 | 2/2004 | Driscoll, Jr. et al. |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0064688 A1 | 4/2004 | Jacobs |
| 2004/0073917 A1 | 4/2004 | Pedlow, Jr. et al. |
| 2004/0078575 A1 | 4/2004 | Morten et al. |
| 2004/0086127 A1 | 5/2004 | Candelore |
| 2004/0088552 A1 | 5/2004 | Candelore |
| 2004/0088558 A1 | 5/2004 | Candelore |
| 2004/0100510 A1 | 5/2004 | Milic-Frayling et al. |
| 2004/0111613 A1 | 6/2004 | Shen-Orr et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0141314 A1 | 7/2004 | Vautrin et al. |
| 2004/0158721 A1 | 8/2004 | Candelore |
| 2004/0165586 A1 | 8/2004 | Read et al. |
| 2004/0181666 A1 | 9/2004 | Candelore |
| 2004/0187161 A1 | 9/2004 | Cao |
| 2004/0240668 A1 | 12/2004 | Bonan et al. |
| 2004/0267602 A1 | 12/2004 | Gaydos et al. |
| 2005/0004875 A1 | 1/2005 | Kontio et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevois |
| 2005/0169473 A1 | 8/2005 | Candelore |
| 2005/0192904 A1 | 9/2005 | Candelore |
| 2006/0026926 A1 | 2/2006 | Triel et al. |
| 2006/0029060 A1 | 2/2006 | Pister |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0153379 A1 | 7/2006 | Candelore et al. |
| 2006/0168616 A1 | 7/2006 | Candelore |
| 2006/0174264 A1 | 8/2006 | Candelore |

FOREIGN PATENT DOCUMENTS

| | | |
|---|---|---|
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 674 440 | 9/1995 |
| EP | 0 674 441 | 9/1995 |
| EP | 0833517 | 4/1998 |
| EP | 0866615 | 9/1998 |
| EP | 1187483 | 3/2002 |
| JP | 7067028 | 3/1995 |
| JP | 11159162 | 6/1999 |
| JP | 11243534 | 10/2002 |
| JP | 2003330897 | 11/2003 |
| JP | 2004264971 A * | 9/2004 |
| WO | WO08607224 | 12/1986 |
| WO | WO8607224 | 12/1986 |
| WO | WO-94/10775 | 5/1994 |
| WO | WO9738530 | 10/1997 |
| WO | WO00/31964 | 6/2000 |
| WO | WO0051039 | 8/2000 |
| WO | WO 01 11819 | 2/2001 |
| WO | WO 01/65762 A2 | 9/2001 |
| WO | WO01/78386 | 10/2001 |

OTHER PUBLICATIONS

Dittmann, Jana, et al., "Multimedia and Security Workshop at ACM Multimedia," Bristol, UK, (Sep. 1998).

Dondeti, Lakshminath R., et al., "A Dual Protocol for Scalable Secure Multicasting," 1999 International Symposium on Computers and Communication, Jul. 6-8, 1999.

Gonzalez, R.C., et al., "Digital Image Processing," Addison Wesley Publishing Company, Inc., (1992) 346-348.

Kim, et al., "Bit Rate Reduction Algorithm for a Digital VCR," IEEE Transactions on Consumer Electronics, vol. 37, No. 3, (Aug. 1, 1992), 267-274.

Kondo, et al., "A New Concealment Method for Digital VCRs," IEEE Visual Signal Processing and Communication, Melbourne, Australia, (Sep. 1993) 20-22.

Kondo, et al., "Adaptive Dynamic Range Coding Scheme for Future Consumer Digital VTR," 219-226.

Kondo, et al., "Adaptive Dynamic Range Coding Scheme for Future HDTV Digital VTR," Sony Corporation, (1991).

Kunkelmann, Thomas, Applying Encryption to Video Communication, Multimedia and Security Workshop at ACM Multimedia ?98, Bristol, UK (Sep. 1998) 41-47.

Menezes, Alfred J., et al., "Handbook of Applied Cryptography," CRC Press, 551-553.

NHK Laboratories Note, Error Correction, Concealment and Shuffling, No. 424, (Mar. 1994), 29-44.

Qiao, Lintian, et al., Comparison of MPEG Encryption Algorithms, Department of Computer Science, University of Illinois at Urbana-Champaign, (Jan. 17, 1998), 1-20.

Shi, Changgui, et al., An Effcient MPEG Video Encryption Algorithm, 1998, IEEE, Department of Computer Sciences, Purdue University, West Lafayette, IN, 381-386.

Spanos, George A., et al., "Performance Study of a Selective Encryption Scheme for the Security of Networked, Real-Time Video," IEEE, (1995), 2-10.

Taylor, Jim, "DVD Demystified—The Guidebook for DVD-Video and DVD-ROM," Pub. McGraw-Hill, ISBN: 0-07-064841-7, (1998), pp. 134-147.

Tom, et al., "Packet Video for Cell Loss Protection Using Deinterleaving and Scrambling," ICASSP 91; 1991 International Conference on Acoustics, Speech and Signal Processing, vol. 4, (Apr. 1991) 2857-2860.

Wu, S. Felix, et al., "Run-Time Performance Evaluation for a Secure MPEG System Supporting Both Selective Watermarking and Encryption," submitted to JSAC special issue on Copyright and Privacy Protection (Mar. 1, 1997).

Zeng, Wenjun, et al., "Efficient Frequence Domain Video Scrambling for Content Access Control," In Proc. ACM Multimedia, (Nov. 1999).

Zhu, et al., "Coding and Cell-Loss Recovery in DCT-Based Packet Video," IEEE Transactions on Circuits and Systems for Video Technology, No. 3, NY, (Jun. 3, 1993).

"McCormac Hack Over Cablemodem," HackWatch http://www.hackwatch.com/cablemodbook.html, Aug. 10, 1998.

"Message Authentication with Partial Encryption," Research disclosure RD 296086, Dec. 10, 1998.

"Metro Media PVR-DVD-MP3-Web," Internet publication fROm www.metrolink.com (undated).

"New Digital Copy protection Proposal Would Secure Authorized Copies," PR Newswire, Nov. 13, 1998, 1-3.

Agi, Iskender, et al., "an Empirical Study of Secure MPEG Video Transmissions," IEEE Proceedings of SNDSS ? 96, (1996), 137-144.

Alattar, Adnan, et al., "Evaluation of Selective Encryption Techniques for Secure Transmission of MPEG-Compressed Bit-Streams," IEEE, (1999), IV-340 to IV-343.

Alattar, Adnan, M., et al., "Improved Selective Encryption Techniques for Secure Transmission of MPEG Video Bit-Streams," IEEE, (1999) 256-260.

Benini, Luca, et al., "Energy-Efficient Data Acrambling on Memory-Processor Interfaces", *ISLPED'03.* Aug. 25-27, 2003, Seoul, Korea, (2003), 26-29.

Liu, Zheng, et al., "Motion Vector Encryption in Multimedia Streaming", *Proccedings of the 10th International Multimedia Modeling Conference 2004 IEEE*, (2004), 1-8.

Naor, Moni, et al., "Certificate Revocation and Certificate update", Apr. 2000, *IEEE Journal on Selected Areas in Communications, IEEE*, vol. 18, No. 4, (2000), 561-570.

Park, Joon S., et al., "Binding Identities and Attributes Using Digitally Singed Certificates", *IEEE*, (2000).

Piazza, Peter, "E-Signed, Sealed, and Delivered", *Security Management*, vol. 45, No. 4, (Apr. 2001), 72-77.

Shavik, Kirstnamurthy, "Securant Technologies Delivers Broad PKI Integration to Enable Standards Based Security", *Business Wires*, (Oct. 4, 1999).

Wu, Tsung-Li, et al., "Selective Encryption and Watermarking of MPEG Video (Extended Abstract)", *International Conference on Image Science, Systems, and Technology, CISST?97*, (Feb. 17, 1997).

"Ad Agencies and Advertisers To Be Empowered with Targeted Ad Delivered by Television's Prevailing Video Servers", *Article Business Section of The New York Times*, (Dec. 20, 2001).

"CLearPlay: The Technology of Choice", from web site, http://www.clearplay.com/what.asp, *ClearPlay 2001-2003*.

"How Networks Work, Millennium Edition", *Que Corporation*, (Sep. 2000), 88-89.

"MPEG-2 Digital Broadcast Pocket Guide", vol. 6 Revised, *Aeterna, LLC.*, Germantown, Maryland USA., (2001), 1-59.

"Passage Freedom to Choose", *Sony Electronics Inc.*, (2003).

"Pre-Encryption Profiles—Concept Overview and Proposal", *Rev. 1.2 as submitted to the Open CAS consortium on Dec. 28, 2000.*, (Dec. 28, 2000).

Brown, Jessica, "The Interactive Commercial, Coming Soon to a TV Near You".

Gulwani, Sumit, "A Report on Security Issues in Multimedia", *Department of Computer Science and Engineering, Indian Institute of Technology Kanpur*, Course Notes, (Apr. 30, 2000), pp. 10-14.

Haberman, Seth, "Visible World—A High Impact Approach to Customized Television Advertising", (Dec. 2001).

Koenen, Rob H., et al., "The Long March to Interoperable Digital Rights Management", *IEEE*, (2004), 1-17.

Lookabaugh, Tom, et al., "Selective Encryption and MPEG-2", *ACM Multimedia '03*, (Nov. 2003).

NCUBE, "Digital Program Insertion", (May 2001).

NCUBE, "Smooth Ad Insertion Deployment Protects Revenues", (2004).

OPENTV, "OPENTV to Showcase Several Advanced Interactive Television Solutions at IBC 2004", (Sep. 6, 2004).

Park, et al., "A Simple Concealment for ATM Bursty Cell Loss", *IEEE Transactions on Consumer Electronics*, No. 3, (Aug. 1993), 704-709.

Pazarci, Melih, et al., "Data Embedding in Scrambled Digital Video", *Computers and Communication Proceedings, Eighth IEEE International Symposium on 2003, vol. 1 (ISCC 2003*, (2003), 498-503.

Robert, Arnaud, et al., "Digital Cable: The Key to Your Content", *Access Intelligence's Cable Group*, online at http:www.cableworld.com/ct/archives/0202/0202digitalrights.htm, (Feb. 2002).

Rosenblatt, Bill, "Coral Consortium Aims to Make DRM Interoperable", online at http://www.drmwatch.com/standards/article.php/3418741, (Oct. 4, 2004).

Seachange International, "Dynamic-Customized TV Advertising Creation and Production Tools", *Web Site Literature*.

Seachange International, "Transport Streams Insertion of Video in the Compressed Digital Domain", *Web Site Literature*, (2000).

Thawani, Amit, et al., "Context Aware Personalized Ad Insertion in an Interactive TV Environment".

Wu, Chung-Ping, et al., "Fast Encryption Methods for Audiovisual Data Confidentiality", *SPIE International Symposia on Information Technologies* (Boston, Ma., USA), (Nov. 2000), 284-295.

\* cited by examiner

US 7,567,939 B2

METHOD AND APPARATUS FOR IMPLEMENTING REVOCATION IN BROADCAST NETWORKS

CROSS-REFERENCES TO RELATED APPLICATIONS

This is a continuation of U.S. patent application Ser. No. 09/504,968 filed Feb. 15, 2000 now U.S. Pat. No. 7,224,164.

BACKGROUND OF THE INVENTION

1. Field of the Invention

The present invention relates to digital devices. More specifically, the present invention relates to a copy management system and method for controlling the reproduction and recording of digital content on and from at least one digital device.

2. General Background

Analog communication systems are rapidly giving way to their digital counterparts. Digital television is currently scheduled to be available nationally to all consumers by the year 2002 and completely in place by the year 2006. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to, this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who desire to prevent the unauthorized and uncontrolled copying of copyrighted, or otherwise protected, material.

In response, there is a movement to require service providers, such as terrestrial broadcast, cable and direct broadcast satellite (DBS) companies, and companies having Internet sites which provide downloadable content, to introduce protection schemes. Two such copy protection systems have been proposed by the 5C group of the Data Hiding Sub Group (DHSG) (5C comprising representatives of Sony, Hitachi, Toshiba, Matsushita, and Intel) and the Data Transmission Discussion Group (DTDG), which are industry committee sub-groups of the Copy Protection Technical Working Group (CPTWG). The CPTWG represents the content providers, computer and consumer electronic product manufacturers.

The DTDG Digital Transmission Copy Protection (DTCP) proposal is targeted for protecting copy-protected digital content, which is transferred between digital devices connected via a digital transmission medium such as an IEEE 1394 serial bus. Device-based, the proposal uses symmetric key cryptographic techniques to encode components of a compliant device. This allows for the authentication of any digital device prior to the transmission of the digital content in order to determine whether the device is compliant. The digital content is itself encoded prior to transmission so that unauthorized copying of the content will result in copy having an unintelligible format.

Thus, even today, the functionality of digital devices such as set-top boxes, digital televisions, digital audio players, and similar such digital devices extends beyond their historical role of conditional access (CA), i.e., merely descrambling content to a CA-clear format for real-time viewing and/or listening, and now include constraints and conditions on the recording and playback of such digital content. For example, currently, copying of scrambled content for subsequent descrambling and viewing or listening may be permitted with the appropriate service/content provider authorization or key provided to the digital device.

SUMMARY OF THE INVENTION

A method of revoking a descrambling privilege for copy controlled content to a host device is provided. The method includes receiving copy controlled content at a conditional access module. A revocation list is also received at the module. The method includes determining whether the host device associated with the module is on the list. If so, the conditional access module will not descramble the content.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
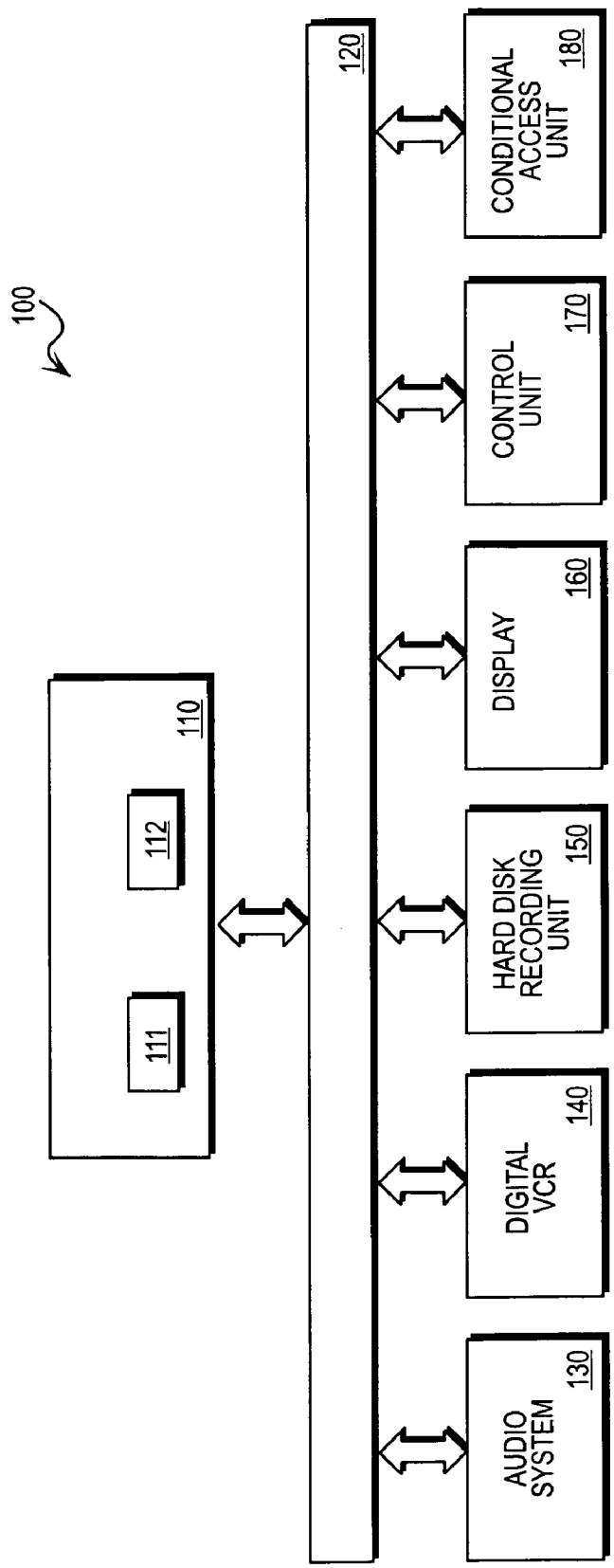
FIG. 1 is a block diagram of an exemplary entertainment system including one embodiment of a digital device.

FIG. 1 is a block diagram of an entertainment system 100 including one embodiment of the copy management system of the present invention. The entertainment system 100 includes a digital device 110 for receiving a digital bitstream including program data from one or more service providers. Such service or content providers can include terrestrial broadcasters, cable operators, direct broadcast satellite (DBS) companies, companies providing content for download via the Internet, or any similar such content and/or service provider. The program data may include system information, entitlement control messages, entitlement management messages, content, and other data, each of which will be described briefly. System information may include information on program names, time of broadcast, source, and a method of retrieval and decoding, and well as copy management commands that provide digital receivers and other devices with information that will control how and when program data may be replayed, retransmitted and/or recorded. These copy management commands may also be transmitted along with entitlement control messages (ECM), which are generally used by the conditional access unit to regulate access to a particular channel or service. Entitlement management messages (EMM) may be used to deliver privileges to the digital receiver 111 such as rights, access parameters, and descrambling keys. As known, a decryption key is generally a code that is required to restore scrambled data, and may be a function of the rights granted. Finally, content in the program data stream may include audio and video data, which may be in a scrambled or clear format.

The digital device or host may be a device within a group including a set top box, television, video player, video recorder, hand disk player, hard disk recorder, personal computer, memory stick recorder, minidisk player, minidisk recorder, digital video disk (DVD) player, DVD recorder, compact disk (CD) player, and CD recorder.

The digital device or host 110 includes a digital receiver 111, which processes the incoming bitstream, extracts the program data therefrom, and provides the program data in a viewable format. The thus extracted program data is then provided to a decoding unit 112 for further processing, including separation of the system information from the content, as well as decoding, or decompressing, of the content to its original form. The digital receiver 111 also regulates access to the program data by other components on the entertainment system 100, and according to one embodiment of the present invention, supports the simultaneous transmission of program data having content in a descrambled format (hereinafter referred to as "descrambled content") and program data having content in a scrambled format (hereinafter referred to as "scrambled content").

According to one embodiment of the present invention, the digital device 110 is a digital television set where the digital receiver 111 is a set-top box integrated therein, and the decoding unit 112 is an MPEG (Motion Picture Experts Group) decoder. The digital television set's display (not shown) is, according to this embodiment, integrated within the digital device 110. Alternatively, it will be appreciated that the digital device 110 may include only the digital receiver 111 and/or the decoder unit 112, with a display being external to the decoding device 110. An example of this embodiment would be an integrated receiver/decoder (IRD) such as a stand-alone set-top box which outputs NTSC, PAL or $Y_pB_pR$ signals. All such embodiments are included within the scope of the present invention.

Digital device 110 may be coupled to other components in the entertainment system 100 via a transmission medium 120. The transmission medium 120 operates to transmit control information and data including program data between the digital device 110 and other components in the entertainment system 100. It will be appreciated that the entertainment system 100 of FIG. 1 is merely an exemplary embodiment, and that other analog and/or digital components may be added or substituted for the components briefly described hereinafter.

Referring to FIG. 1, the entertainment system 100 may include an audio system 130 coupled to the transmission medium 120. The audio system 130 may include speakers and an audio player/recorder such as a compact disc player, a Sony MiniDisc® player, or other magneto-optical disc that may be used to play and/or record audio data. A digital VCR 140, such as a D-VHS VCR, may also be coupled to the digital device 110 and other components of the entertainment system 100 through the transmission medium 120. As known, the digital VCR 140 may be used to record analog or digital audio, video, and other data transmissions, and according to an embodiment of the present invention, may be used to record program data received by the digital device 110 and transmitted to the digital VCR over transmission medium 120.

A hard disk recording unit 150 may also be coupled to digital device 110 and other components via transmission medium 120. The hard disk recording unit 150 may be a personal computer system, a stand-alone hard disk recording unit, or other hard disk recording device capable of recording analog or digital audio, video and data transmissions. As with digital VCR 140, according to one embodiment of the present invention, the hard disk recording unit 150, may be used to record program data received by the digital device 110 and transmitted to the hard disk recording unit 150 over transmission medium 120.

Display 160 may include a high definition television display, a monitor or other device capable of processing digital video signals. In an embodiment where the digital device 110 is a stand-alone set-top box, display 160 may be a digital television set.

Finally, a control unit 170 may be coupled to the transmission medium 120. The control unit 170 may be used to coordinate and control the operation of some or each of the components on the entertainment system 100, as well and other electronic devices remotely coupled thereto.

Figure 2:
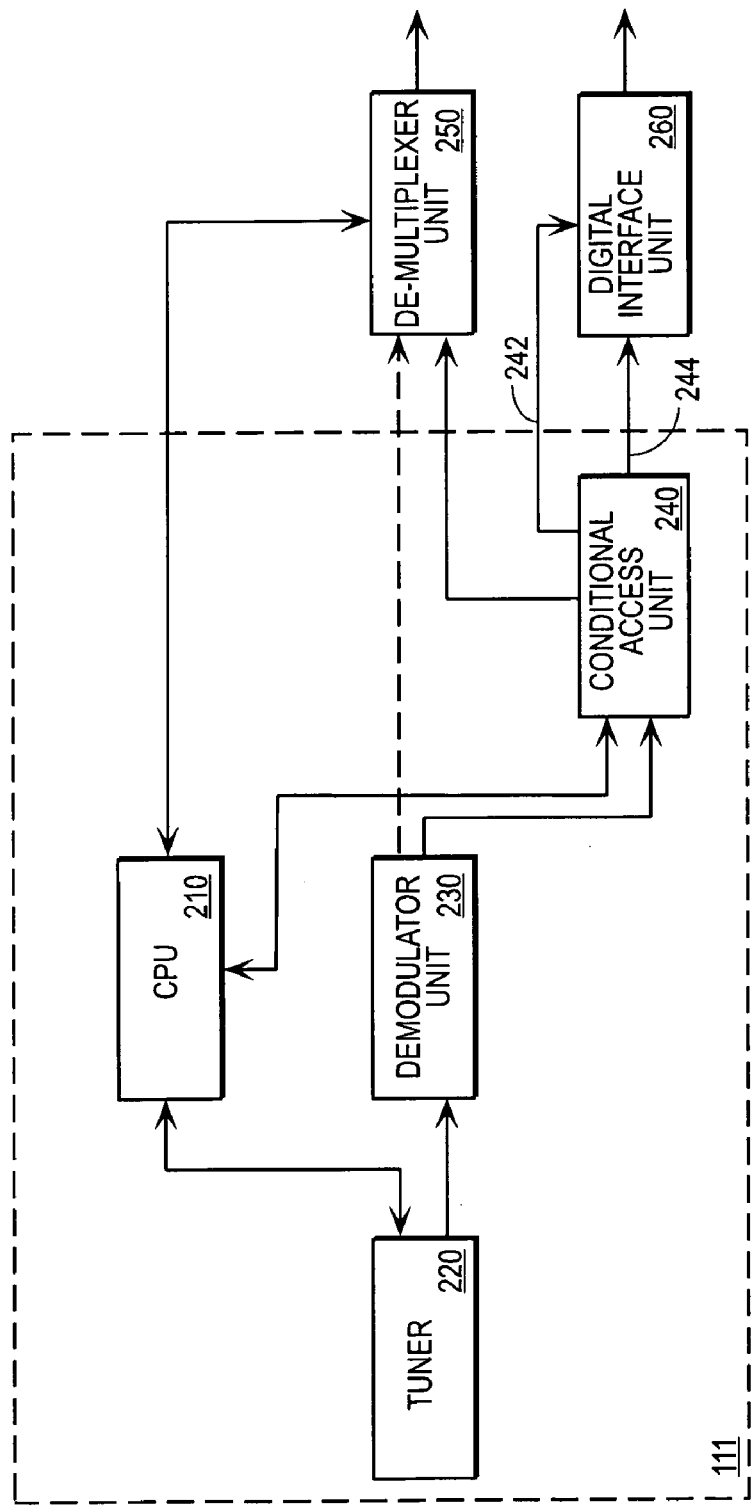
FIG. 2 is a block diagram of one embodiment of a digital receiver of the digital device.

FIG. 2 is a block diagram of one embodiment of the digital receiver 111 including the copy management system according to the present invention. The digital receiver 111 includes a central processing unit (CPU) 210, which controls the overall operation of the digital receiver 111, and determines the frequency in which a selected channel is broadcast or otherwise transmitted. This information is then transmitted to a tuner 220, which then selects the appropriate frequency of the terrestrial, cable, satellite, or Internet transmission in which to receive the incoming digital bitstream, including program data. The CPU 210 may also support a graphical user interface (GUI), such as an electronic programming guide (EPG), the latter allowing a user to navigate through various channels and program options to select a desired channel or program for viewing, listening, recording and the like. The GUI may be displayed on either a display (not shown) of digital device 110 (e.g., where digital device 110 is a digital television set), or on display 160 (e.g., where digital device 110 is a stand-alone set-top box).

Once the tuner 220 has selected the appropriate frequency, it amplifies the incoming digital bitstream, and provides the output bitstream to a demodulator unit 230. The demodulator unit 230 receives the bitstream from the tuner 220 and demodulates the bitstream to provide program data as originally transmitted. The type of demodulation effected by the demodulator unit 230 will of course depend on the type of transmission as well as the modulation process used in the transmission process. For example, in the case of cable transmissions and Internet transmissions received over cable modems, the demodulator unit 230 may perform quadrature amplitude demodulation (QAD), while for satellite broadcasts, quadrature phase shift key (QPSK) demodulation will likely be required. Terrestrial broadcasts, will likely require vestigial side band (VSB) demodulation. The present invention is not limited to any one type of transmission and modulation/demodulation scheme, and other schemes are within the scope and spirit of the present invention. In addition to effecting the demodulation process, demodulator unit 230 may also perform error correction on the received bitstream.

The thus demodulated bitstream is now preferably provided to a conditional access unit 240. (That portion of the demodulated bitstream that is not encrypted may bypass the conditional access unit 240 and be provided directly to the demultiplexer 250 as shown by the dashed lines in FIG. 2. This might also be the case where none of the bitstream needs decrypting, and/or where there is no conditional access module). The conditional access unit 240 generally performs key management and decryption, as well as descrambling functions as follows.

Typically, if the CPU 210 determines that the program data in the digital bitstream includes scrambled content, that program data is provided to a conditional access unit 240. At this point the CPU 210 may transmit packet identifier (PID) information to the conditional access unit 240, such PID information informing the conditional access unit 240 where in the program data the ECM may be found. The CPU 210 may instead receive the ECM and deliver it to the conditional access unit 240. Alternatively, the conditional access unit 240 may have demultiplexing capabilities allowing it to directly obtain the location of the ECM from the bitstream itself. As discussed previously, the ECMs regulate a user's access to a particular channel or service, and determines the access rights that are needed to be held by a receiver 111 in order to grant access. The ECMs may also be used to deliver a decrypting or descrambling key or to deliver information (e.g., an algorithm) as to how to derive a key that may be used to descramble scrambled content. Using such key or information regarding derivation of such key, the conditional access unit 240 may descramble the content contained in the program data. Alternatively, the conditional access unit may provide the key to the demultiplexer 250 which will perform the descrambling.

Importantly, although the conditional access unit 240 is shown as an integral, or embedded, in that both the descrambling and decrypting functions are effected internally in receiver 111, the conditional access unit may also split or external. An external conditional access unit descrambles the program data content and decrypts the keys externally; e.g., as is the case with the National Renewable Security System (NRSS) conditional access modules. In a split conditional access unit, the program data content is descrambled within the digital receiver 111, while the key decryption is completed externally, e.g., via a "smart card." All of these systems are intended to be within the spirit and scope of the present invention.

Once the conditional access unit 240 descrambles the program data content, the program data is input to demultiplexer unit 250, which separates the system information from the content in the program data. According to an embodiment of the demultiplexer unit 250, the demultiplexer unit 250 parses the program data for PIDs that are associated with system information, audio information, and video information, and then transmits the system information to the CPU 210 and the audio and video information to the decoder unit 112. In accordance with one embodiment of the present invention, a digital interface unit 260 is coupled to the conditional access unit 240. Operation of this unit, which allows the receiver 111 to communicate with other digital components in the entertainment system 100, will be discussed at a later point.

The CPU 210, tuner 220, demodulator unit 230, conditional access unit 240, demultiplexer unit 250, and digital interface unit 260 may be implemented using any known technique or circuitry. In one embodiment of the present invention, the CPU 210, tuner 220, demodulator unit 230, demultiplexer unit 250, and digital interface unit 260 all reside in a single housing, while the conditional access unit 240 may reside in an external NRSS-A or NRSS-B conditional access module (as discussed above). Alternatively, the conditional access unit can take the form factor of a Personal Computer Memory Card International Association (PCM-CIA) Type 11 card or a smart card or the like. For example, the conditional access unit may take the form of a Point of Deployment (POD) module or an ISO 7816 smart card.

The content of a digital program may be transmitted in scrambled form. In order for a conditional access unit to recover the scrambled content and permit a person to view the content in clear form, the unit must have the necessary access requirements associated with the scrambled content. An access requirement includes a message that describes the features that the conditional access unit must have in order to decode the scrambled content. The scrambled content may be referred to as "copy controlled content." For example, a certain key may be needed to view the content. Alternatively, a service tag associated with a given content provider may be required. Technical requirements such as a particular descrambling method may also be required and included as a part of the access requirements. The access requirements associated with a particular program may be transmitted to a conditional access unit along with the program.

Thus, after the host 110 has the access requirements necessary to view a given program content, the host 110 has access to display the content in the clear on display 160 unless that host's access has been revoked. When the host's access has been revoked, the revocation information is sent to a conditional access (CA) unit 240 associated with the host. The revocation information is sent to the CA unit 240 in a certified revocation list (CRL), which may be trickled out over a network. The network may be a home network using a Universal Serial Bus, Blue Tooth, and Panel Link communication mediums. The revocation information includes a list of hosts whose access has been revoked. In one embodiment, the revocation is for the entire service. Alternatively, the revocation may be limited to a specific content provider, such as HBO for example, thus allowing the host to display the content of other channels that have not been revoked.

The revocation list is sent to the CA unit 240 on a well known packet identifier (PID). In a cable network system, the certificate revocation lists may be sent in-band, along with the program content, which allows for easier time shifting by bitstream recorders. Alternatively, the CRL may be sent to the CA unit in an out of band (OOB) channel, by telephone wires, or by a modem if sent OOB, then it can be delivered to multicast IP addresses. The revocation list can be received and read in real time. Thus, the CRL does not need to be stored, which reduces the overall system memory requirements.

The revocation lists can be divided into lists for different groups of hosts. Multiple lists, where each list corresponds to a different group of hosts, can be sent to the CA units. The CA unit only has to read the list for the corresponding host's group. For example, if the host identifier (ID) is a numeric value, then the range of the host IDs in a given list can be used by the CA unit to quickly determine whether the given list may contain revocation information for the corresponding host. Thus, the CA module can ignore CRLs that have host ID ranges greater than or less than the ID value for the corresponding host of the CA unit.

If the CRL has a range of values that bound the corresponding host's numerical ID value, the CA unit may check the CRL. In one embodiment, the CRL is checked when the CA unit is initially associated with the corresponding host. In another embodiment, the CRL may be checked when a new version of the CRL is sent to the CA unit. The CA module can compare the version number of the received CRL with the version number of the last checked CRL stored in the CA unit's memory. If the received version number is greater than the stored version number, the newly received CRL is read to determine whether the host is on the list.

Figure 3:
FIG. 3 shows an embodiment of an ECM that includes a CRL version number.

An embodiment of an ECM that includes the CRL version number is shown in FIG. 3. The CRL version information includes the CRL version number and reception time, 310. The ECM may further include the encrypted key 320 for descrambling content, access requirements 330, and an optional signature 340. This ECM allows the CA module to know which CRL version number is the current version number. The CRL itself may be formatted as a data structure. In one embodiment, the CRL is formatted as a private syntax information (PSI) data structure, which is well known in the art. The PSI data structure may also be a MPEG PSI data structure.

The information in the CRL may be filtered and read by either the host or the CA unit. The CA module determines whether the host device appears on the list. Also, if the host device has a 1394 digital interface, the host device can use the CRL information to determine whether other devices in the 1394 home network appear on the list. In one embodiment, there may be two lists, where one list is for the CA hosts and 1394 devices, and the other list is for the other devices. The size of the second list would be substantially smaller than the first list, so that it could be stored in the memory of the host and other devices.

If the host for the CA unit is identified in the revocation list, then the CA unit will not decode the scrambled program content for the corresponding host. Whenever a CA unit identities a host in the CRL, the host is marked as revoked in the internal memory of the CA module. The host may be un-revoked if the host does not appear in a subsequent CRL.

The CA unit includes a memory that stores the revocation status for a plurality of hosts that the CA unit has been connected to. Also, the CA unit can determine the revocation status of program content that has been stored in scrambled form in a digital memory, such as tape for example. If the version number of the CRL stored on the tape is smaller than the version number in the CA unit's memory, then the CA unit will ignore the revocation information stored on the tape.

Alternatively, the CA unit can speculatively and tentatively descramble the program content for a given period of time before the CA unit receives the revocation list. For example, if the CA unit has not received a CRL for the host, the CA unit can descramble the scrambled content for a given period of time, called a timeout period. The timeout period can be determined at the headend or broadcast station, and sent to the CA unit in an ECM. The timeout period may be long enough for the CA unit to receive the CRL multiple times before the timeout period ends, but short enough so that a pirate may not receive significant portions of the content before the timeout period ends.

The timeout counter, once started, will continue to count down to the end of the timeout period, even if a user changes the content that is descrambled, for example, by changing the channel of the tuner. If the CA unit checks the CRL list for the host during the timeout period and the host is not on the list, then the CA unit may continue to descramble the program content. If the host is on the list, then the CA unit ceases to descramble. Also, if the timeout period ends before the CA unit checks the CRL, the CA unit stops descrambling the program content.

Figure 4:
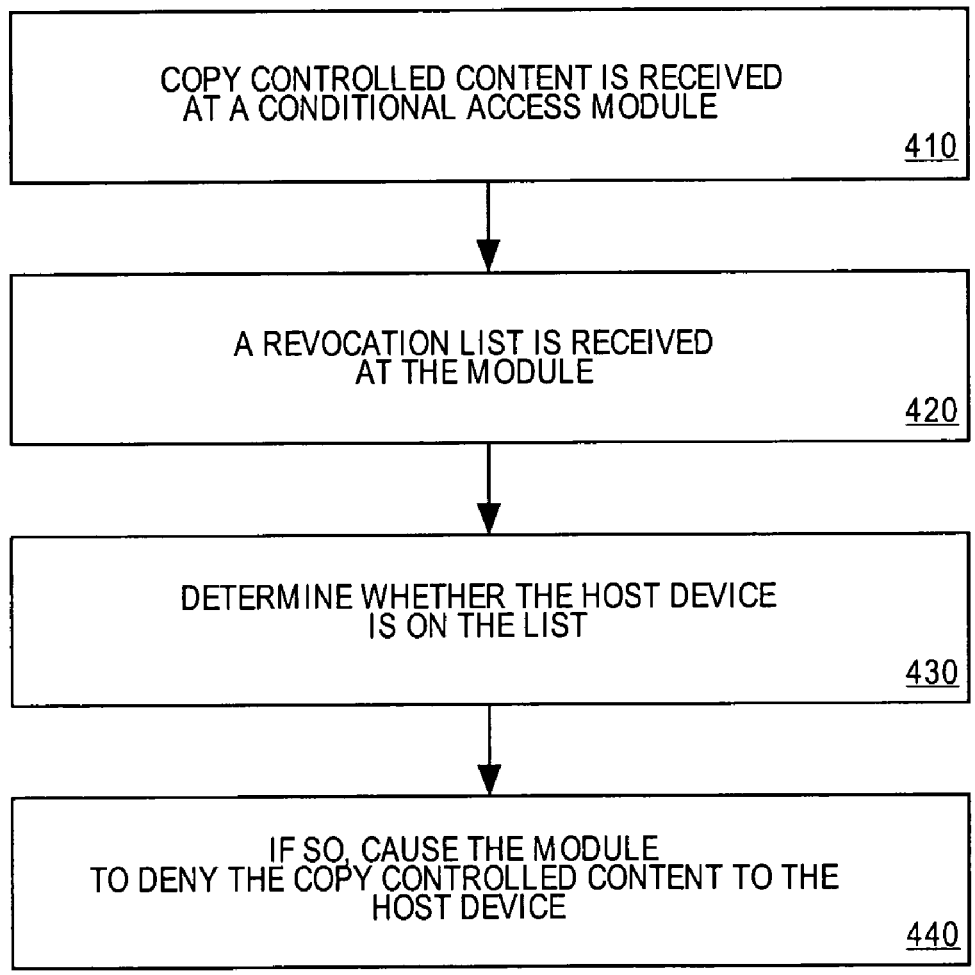
FIG. 4 shows an embodiment of a method of revoking.

FIG. 4 shows an embodiment of a method of revoking. Scrambled copy controlled content is received at a conditional access module, 410, a revocation list is received at the module, 420. The method includes determining whether the host device is associated with the module is on the list, 430. If so, the method causes the conditional access module to deny the content controlled to the host device, 440. The conditional access module may also not descramble the copy controlled content.

While the invention is described in terms of embodiments in a specific system environment, those of ordinary skill in the art will recognize that the invention can be practiced, with modification, in other and different hardware and software environments within the spirit and scope of the appended claims.

What is claimed is:

1. A method comprising:
   receiving copy controlled content;
   receiving a plurality of revocation lists each corresponding to a given range of host identifiers, wherein the revocation list is received in band;
   verifying by a computer that an identifier of a digital device is within the range of host identifiers by determining which revocation list of the plurality of revocation lists comprises a range of host identifiers within which the identifier of the host device is bound the computer being a digital device;
   determining whether the digital device is on any of the revocation lists; and
   if the digital device is determined to be on any of the revocation lists, denying the copy controlled content to the digital device.

2. The method of claim 1, wherein the plurality of revocation lists are received in band after the identifier of the device is verified to be within the range of the identifiers for the one of the plurality of revocation lists.

3. The method of claim 1 further comprising allowing access to the copy controlled content if the digital device is not listed on any of the revocation lists.

4. The method of claim 1, wherein the copy controlled content is denied to the digital device by not descrambling the copy controlled content.

5. The method of claim 1, wherein the digital device is selected from the group including of a set top box, television, video player, video recorder, hard disk player, hard disk recorder, personal computer, memory stick recorder, minidisk player, minidisk recorder, digital video disk (DVD) player, DVD Recorder, compact disk (CD) player and CD recorder.

6. The method of claim 1, further comprising descrambling during a timeout period and providing the copy controlled content to the digital device if a host identifier is not on any of the revocation lists.

7. The method of claim 6, wherein the timeout period allows for the revocation list to be received at least twice but prevents receiving a significant portion of the copy controlled content.

8. A method comprising:
   receiving copy controlled content;
   receiving a plurality of revocation lists corresponding to a given range of host identifiers, wherein the plurality of revocation lists are received in band;
   authenticating by a computer one of the plurality of revocation lists as having a larger revocation list version number than a stored version number of a prior revocation list the computer being a digital device;
   verifying that an identifier of a digital device is within the range of host identifiers;
   determining whether the digital device is on any of the revocation lists; and
   if the digital device is determined to be on any of the revocation lists denying the copy controlled content to the digital device.

9. The method of claim 8, wherein the plurality of revocation lists include a plurality of lists organized based on device type.

10. The method of claim 8, wherein the plurality of revocation lists include a plurality of lists organized based on devices having a selected interface.

11. A device for controlling access to copy controlled content, comprising:
- a tuner to tune to a selected frequency for receipt of the copy controlled content;
- a demodulator unit coupled to the tuner, the demodulator unit to demodulate the copy controlled content; and
- means for receiving a plurality of revocation lists each corresponding to a different range of host identifiers and device characteristics, the unit to determine whether an identifier of the device is within a range of any of the plurality of revocation lists, each list based on a selected device characteristic, and if so, to (i) determine whether the identifier of the device on one of the plurality of revocation lists by determining which revocation list of the plurality of revocation lists comprises a range of identifiers within which the identifier of the device is bound and (ii) deny the copy controlled content to the device if the identifier is listed on one of the plurality of revocations lists.

12. The device of claim 11, wherein the unit is a conditional access unit.

13. The device of claim 11, wherein the unit receives the plurality of revocation lists in band as part of a digital bitstream having the copy controlled content.

14. The device of claim 11, wherein unit receives the plurality of revocation lists out of band with the plurality of revocation lists being transmitted through a separate medium than the copy controlled content.

15. The device of claim 11, wherein the unit receives the plurality of revocation lists over a telephone line and the copy controlled content over either a cable or a wireless satellite transmission.

16. The device of claim 11 further comprising a processor coupled to the access unit.

17. The device of claim 16, wherein the processor to receive an enhancement control message, the enhancement control message including a key to descramble the copy controlled content.

18. The device of claim 17, wherein the unit receives the enhancement control message along with the copy controlled information and the processor transmits information to the unit to enable the unit to locate the enhancement control message.

19. The device of claim 11 further comprising:
- a de-multiplexer unit coupled to the unit, the de-multiplexer unit to descramble the copy controlled content based on information provided by the unit.

20. The device of claim 19 further comprising:
- a de-multiplexer unit coupled to the unit, the de-multiplexer unit to (i) separate system information within incoming program data received by the tuner where the program data includes the copy controlled content, and (ii) transmit audio and video information of the copy controlled content to a decoder unit.

21. The device of claim 11 further comprising:
- a digital interface unit coupled to the unit, the digital interface unit to enable communications with digital components of an entertainment system including the device.

22. The device of claim 11, wherein the revocation list includes a plurality of lists organized based on device type.

23. The device of claim 11, wherein the revocation list includes a plurality of lists organized based on devices having a selected interface.

24. A method comprising:
- verifying by a computer that an identifier of the computer is within a range of identifiers associated with a revocation list, the computer being a digital device;
- performing an initial analysis by determining whether the computer can be on the revocation list upon verification that the identifier of the computer is within the range of the identifiers covered by the revocation list;
- performing a secondary analysis and
  - refraining from decoding encoded content received by the computer if the identifier of the computer is within the range of the identifiers and the computer is determined to be on the revocation list; and
  - allowing decoding of the encoded content if the identifier of the computer is within the range of the identifiers and the computer is not determined to be on the revocation list.

25. The method of claim 24, wherein the revocation list is received in band as part of a digital bitstream including encoded content.

26. The method of claim 24, wherein the identifier is a host identifier being a numeric value.

27. The method of claim 24, wherein the encoded content is scrambled.

28. The method of claim 24, further comprising allowing decoding of the encoded content during a timeout period if the revocation list has not been received.

29. The method of claim 28, wherein the timeout period allows for the revocation list to be received at least twice but prevents receiving a significant portion of the copy controlled content.

* * * * *